March 22, 1927.

F. P. DROHAN 1,622,187

LIGHT

Filed Feb. 13, 1926

Francis Pierce Drohan
INVENTOR

WITNESS

BY

ATTORNEY

March 22, 1927.                                              1,622,187
F. P. DROHAN
LIGHT
Filed Feb. 13, 1926                    4 Sheets-Sheet 2

Francis Pierce Drohan
INVENTOR
BY Victor J. Evans
ATTORNEY

WITNESS: John Donovan

March 22, 1927. 1,622,187

F. P. DROHAN

LIGHT

Filed Feb. 13, 1926  4 Sheets-Sheet 3

Francis Pierce Drohan
INVENTOR

BY Victor J. Evans
ATTORNEY

WITNESS:

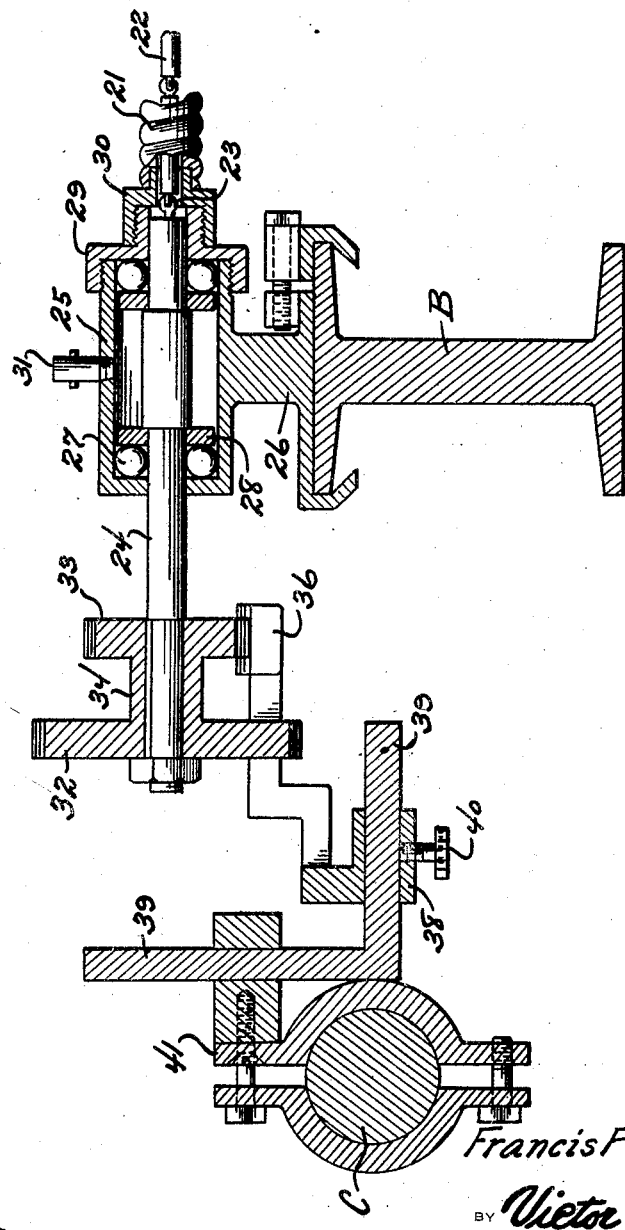

Patented Mar. 22, 1927.

1,622,187

UNITED STATES PATENT OFFICE.

FRANCIS PIERCE DROHAN, OF JACKSONVILLE, FLORIDA.

LIGHT.

Application filed February 13, 1926. Serial No. 88,133.

This invention relates to a dirigible lamp for motor vehicles and the like, the general object of the invention being to provide a lamp which is caused to move with the steering mechanism of the vehicle so that the rays of light will follow the road on curves as well as on straight portions.

Another object of the invention is to provide means whereby the lamp can be adjusted to throw its rays to one side of the road so that the near side of the road will be illuminated, with means for causing the lamp to move to a greater extent when the vehicle is making a left hand turn than it does when the vehicle is making a right hand turn, so that the rays of light will be thrown upon the left hand edge of the road when left hand turns are being made, this additional movement not only illuminating the edge of the road in making left hand turns but also acting to warn drivers of other vehicles when a left hand turn is suddenly made in order to avoid striking objects on the road ahead, for when this is done, the rays of light from the lamp will be thrown across the road so that the other drivers will see it and thus be warned.

A further object of the invention is to make the different parts adjustable so that the lamp can be set at the proper angle and the device can be applied to different makes of vehicles.

A still further object of the invention is to so form the attaching means that the device can be easily and quickly attached to a vehicle.

This invention also consists in certain other features of construction and in the combination and arrangement of the several parts, to be hereinafter fully described, illustrated in the accompanying drawings, and specifically pointed out in the appended claims.

In describing my invention in detail, reference will be had to the accompanying drawings wherein like characters denote like or corresponding parts throughout the several views, and in which:—

Figure 7 is a section on line 7—7 of Figure 6.

Figure 1:
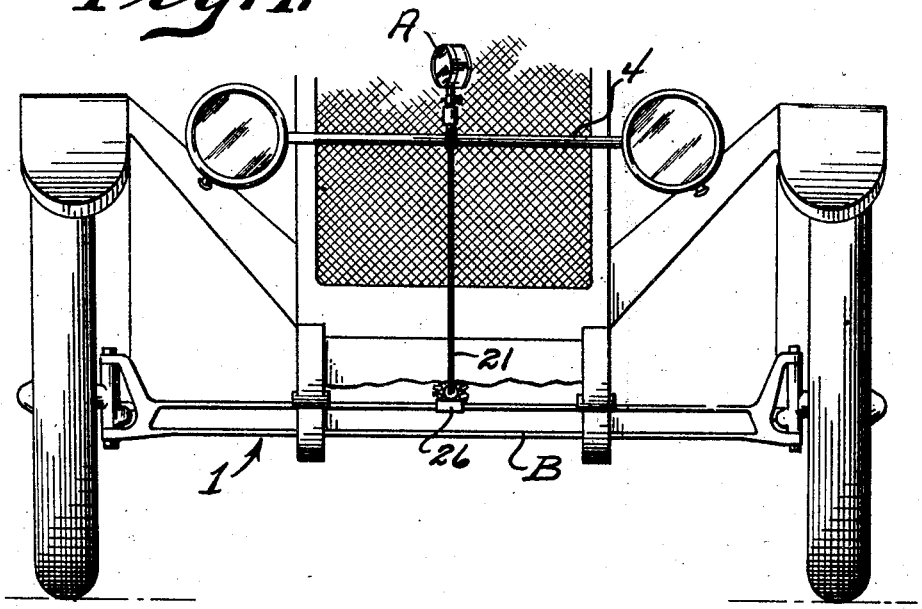
Figure 1 is a front view of an automobile showing the improved device applied thereto.
Figure 2:
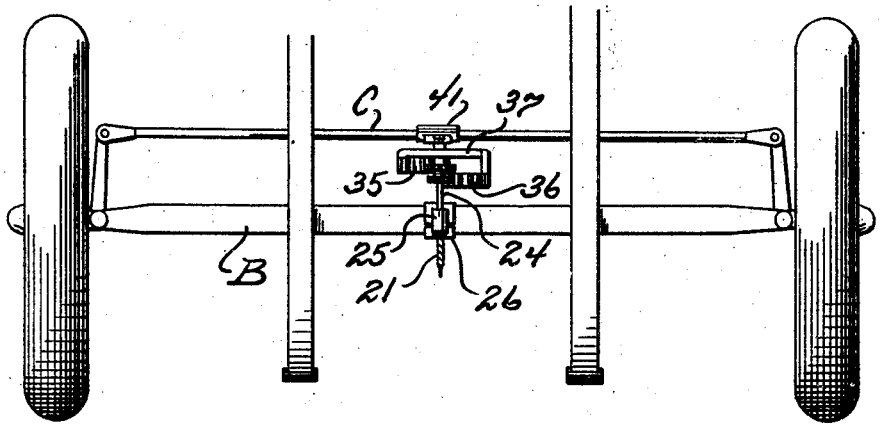
Figure 2 is a plan view of the front part of the chassis of a vehicle, showing a portion of the invention placed thereon.
Figure 3:
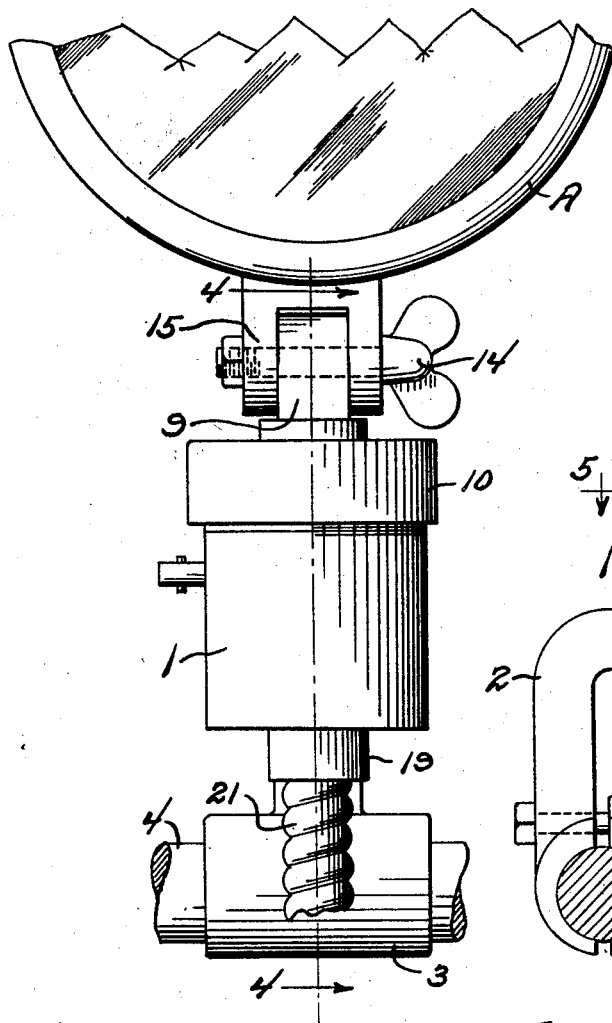
Figure 3 is an enlarged view of the supporting means for the lamp.
Figure 4:
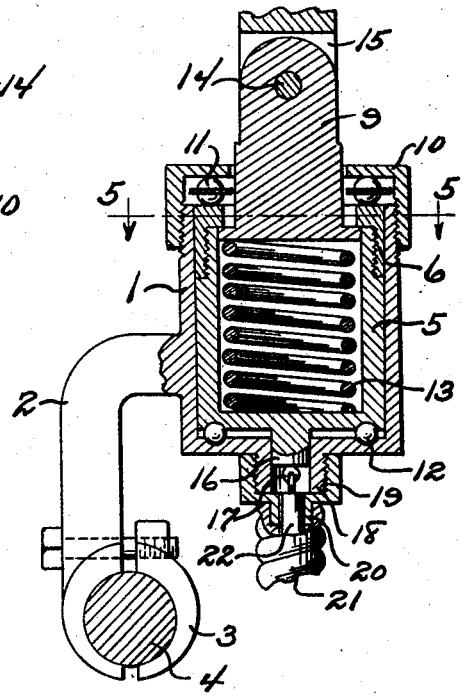
Figure 4 is a section on line 4—4 of Figure 3.
Figure 5:
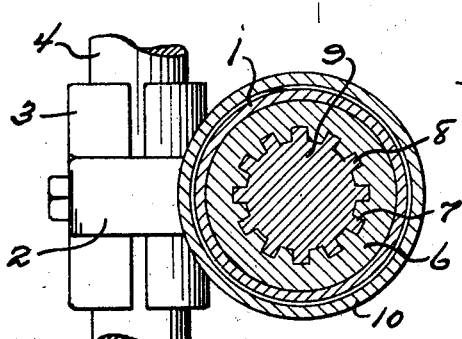
Figure 5 is a section on line 5—5 of Figure 4.
Figure 6:
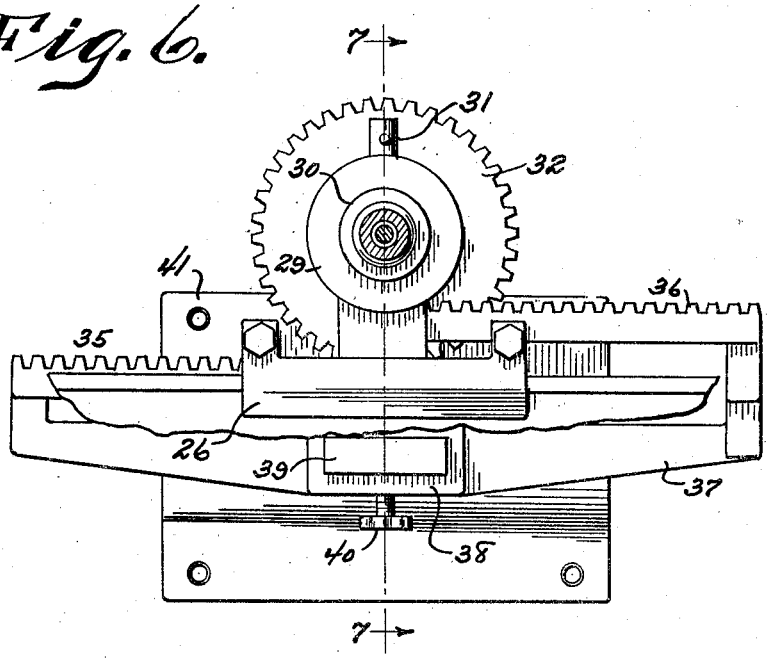
Figure 6 is a front view of the rack and gear carrying part.
Figure 8:
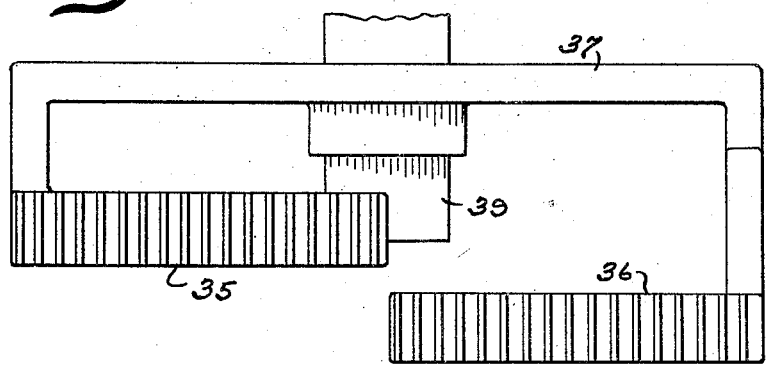
Figure 8 is a plan view of the rack carrying part.

In these views, 1 indicates a cylinder which is provided with an arm 2 which is adapted to be fastened by means of a clamp 3 for instance, to a part of a vehicle, preferably the bar 4 which connects the headlamps of the vehicle together. A second cylinder 5 is rotatably mounted in the first cylinder and has a cap 6 threaded thereto and which has the notches 7 therein for receiving the teeth 8 on the post 9 which has its base arranged in the cylinder 5 with its stem passing through an opening in the cap. This post also passes through an opening in a cap 10 which closes the cylinder 1, anti-friction bearings 11 being arranged between the caps 6 and 10 and similar bearings 12 being arranged between the bottoms of the two cylinders. A coil spring 13 is arranged in the cylinder 5 and acts to hold the post 9 in raised position with its teeth in engagement with the notches of the cap 6. By pushing the post 9 downwardly against the action of the spring, its teeth will be freed of the notches and then the post can be turned to adjust it, the spring returning it to its raised position with the teeth engaging the notches again so that it will be held in adjusted position. A lamp A is pivoted to the post by means of the bolt 14 passing through the ears 15 on the lamp body and through the upper end of the post. This arrangement permits the lamp body to be tilted about a horizontal axis to adjust the point at which the rays of light will strike the road ahead and by adjusting the post 9 in the supporting cylinders the point at which the rays of light will strike the side of the road can be adjusted, it being preferable to have the light focussed on edge of the road at an angle of 45°.

The bottom of the cylinder 5 is provided with a short stem 16 which carries an eye 17 and said stem projects into a tubular extension 18 on the bottom of the cylinder 1. This extension is threaded exteriorly to receive a cap 19 which has a threaded projection 20 to receive the threaded end of a flexible tube 21 which encloses the link shaft 22 which has one end connected with the eye 17 so that when the shaft 22 is rotated, the cylinder 5 will also be rotated within the cylinder 1 and this movement will be communicated to the post 9 and the lamp through means of the toothed connection between the cylinder 5 and said post.

The other end of the shaft 22 is connected by the eyes 23 with one end of a shaft 24 which is rotatably supported in a cylinder 25 attached to the front axle B of the vehicle by the clamp 26. Anti-friction bearings 27 are arranged in the cylinder and are engaged by the disks 28 on the shaft. A cap 29 closes one end of the cylinder and is provided with a threaded extension which is engaged by a cap 30 to which the other end of the flexible tube 21 is connected. The cylinder may be provided with a lubricant supplying device 31. The shaft 24 has attached thereto a double gear which is composed of the large gear 32 and the small gear 33 which are connected together by the sleeve 34. The gears are arranged to engage the racks 35 and 36 which are carried by the yoke-shaped frame 37, the center portion of which is provided with the socket part 38 which is adapted to receive one arm of an L-shaped member 39 and to be clamped thereto by the set screw 40. This L-shaped arm 39 is carried by a part of a clamp 41 which is clamped to the connecting rod C of the steering mechanism of the vehicle. As shown, the racks 35 and 36 are out of alignment with each other so that the rack 35 is engaged by the gear 32 and the rack 36 by the gear 33. The racks are also arranged that when one gear is in mesh with its rack, the other gear is free of its rack and when the vehicle makes a turn in one direction, one gear will engage its rack so that the shaft 24 will be rotated and this movement will be communicated to the lamp through the connections shown. When the vehicle is turned in an opposite direction, the other gear will engage its rack so that the shaft 24 will be rotated in an opposite direction and this movement will also be communicated to the lamp as will be understood. As one gear is larger than the other, the shaft will be rotated to a greater extent when the car is turned in one direction than it will be when the car is turned in an opposite direction, this being necessary owing to the fact that the normal position of the lamp A is at an angle to the direction of travel so that its rays will illuminate the near side of the road. It will be seen that the rays of light from the lamp A will remain at an angle of 45°, if it is adjusted to this extent, while the car is traveling on straight stretches of roads and also while it is making right hand turns, but when the car makes a left hand turn, the small gear will engage its rack and thus the parts will be rotated to a much greater extent than when the other gear is in engagement with its rack, so that the lamp will be shifted quickly as the car makes the left hand turn to throw its rays upon the left hand side of the road so that the road will be clearly illuminated, as the car makes the left hand turn.

This device will also act to warn other drivers when the vehicle provided with the lamp is turned suddenly to the left in order to avoid striking obstacles, such as ruts, obstructions and other vehicles as this left hand turn would shift the lamp A to the left so that its rays of light would be thrown across the road where it could be seen by the drivers of other cars and thus warn such drivers that the car ahead is making a sudden turn to the left.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a vehicle, a lamp supported on a part of the same, a rotatable member supported in the lower part of the vehicle, means for communicating the movement of the said member to the lamp, means for moving said member a certain extent when the steering mechanism is moved to turn the vehicle in one direction and means for moving the member to a greater extent when the steering mechanism is manipulated to shift the wheels in the other direction.

2. In a vehicle, a lamp supported on a part of the same, means for adjusting the lamp about a vertical axis, a rotatable member supported in the lower part of the vehicle, means for communicating the movement of the said member to the lamp, means for moving said member a certain extent when the steering mechanism is moved to turn the vehicle in one direction and means for moving the member to a greater extent when the steering mechanism is manipulated to shift the wheels in the other direction.

3. In a vehicle, a lamp supported on a part of the same, means for adjusting the lamp about a horizontal axis, a rotatable member supported in the lower part of the vehicle, means for communicating the movement of the said member to the lamp, means for moving said member a certain extent when the steering mechanism is moved to turn the vehicle in one direction and means for moving the member to a greater extent when the steering mechanism is manipulated to shift the wheels in the other direction.

4. In a vehicle, a lamp supported on a part of the same, means for adjusting the lamp about its vertical axis and also about its horizontal axis, a rotatable member supported in the lower part of the vehicle, means for communicating the movement of the said member to the lamp, means for moving said member a certain extent when the steering mechanism is moved to turn the vehicle in one direction and means for moving the member to a greater extent when the steering mechanism is manipulated to shift the wheels in the other direction.

5. In a vehicle, a lamp, means for rotatably supporting the lamp at the front of the vehicle, a shaft, means for rotatably supporting the same at the lower part of the vehicle, means for connecting the shaft with the lamp so that the movement of the shaft will be communicated to the lamp, a pair of gears of different sizes connected with the shaft, a frame connected with the connecting bar of the steering mechanism, a rack at one end of the frame for engaging one of the gears and a rack at the other end of the frame for engaging the other gear.

6. In a vehicle, a support connected with a part of the front thereof, a member rotatably mounted in the support and having a toothed upper part, a post having its base mounted in the member and provided with a toothed part for engaging the toothed part of said member, spring means for holding the toothed parts together, a lamp tiltably connected with the post, a shaft rotatably supported by the front axle of the vehicle, a flexible shaft connecting the same with the rotatable member, a pair of gears of different sizes carried by the shaft, a frame connected with the connecting rod of the steering mechanism, a rack at one end of the frame engaging one gear and a rack at the other end of the frame engaging the other gear.

In testimony whereof I affix my signature.

FRANCIS PIERCE DROHAN.